E. SCHNEIDER.
ACTUATING MECHANISM FOR INDICATORS FOR MULTICYLINDER ENGINES.
APPLICATION FILED AUG. 21, 1918.

1,295,800.

Patented Feb. 25, 1919.
3 SHEETS—SHEET 1.

Inventor
Eugene Schneider,
By Mauro, Cameron, Lewis & Massie,
Attorneys.

E. SCHNEIDER.
ACTUATING MECHANISM FOR INDICATORS FOR MULTICYLINDER ENGINES.
APPLICATION FILED AUG. 21, 1918.

1,295,800.

Patented Feb. 25, 1919.
3 SHEETS—SHEET 3.

Inventor.
Eugene Schneider,
By Mauro, Cameron, Lewis & Massie,
Attorneys.

UNITED STATES PATENT OFFICE.

EUGÈNE SCHNEIDER, OF PARIS, FRANCE.

ACTUATING MECHANISM FOR INDICATORS FOR MULTICYLINDER ENGINES.

1,295,800.        Specification of Letters Patent.        Patented Feb. 25, 1919.

Application filed August 21, 1918. Serial No. 250,868.

*To all whom it may concern:*

Be it known that I, EUGÈNE SCHNEIDER, a citizen of the French Republic, and a resident of 42, Rue d'Anjou, Paris, France, have invented a new and useful Improvement in Improved Actuating Mechanism for Indicators for Multicylinder Engines, which invention is fully set forth in the following specification.

This invention relates to apparatus for operating engine indicators when used in connection with multiple-cylinder engines.

The usual apparatus for obtaining work diagrams from multiple-cylinder engines by means of indicators of any suitable type (such as Watt's indicator or other known indicators) comprises, as is well known, for each cylinder an indicator the recording stylus of which receives its motion from a member subjected to the action of the gases in the cylinder while the paper on which the diagram is drawn is carried by a drum receiving alternating rotary movements proportional to the alternating rectilinear movements of the corresponding piston or cylinder.

Those known apparatus require, for each of the indicators of a multiple-cylinder engine, transmitting mechanism between the engine crank shaft (or other suitable shaft, such as the distribution shaft, connected to the engine crank shaft) and a shaft for actuating the rod which operates the respective paper drum.

The present invention has for its object to provide a simplified and improved mechanism for actuating the diagram indicators of multiple-cylinder engines.

According to this invention, the actuation of the several paper drums of all the indicators of a multiple-cylinder engine is effected by means of a single crank shaft which, for the purpose of taking diagrams from the several cylinders, is capable of being brought into a suitable starting position for each of said cylinders. This single shaft is, for this purpose, shown as made in two sections, of which one section carries the transmitting member driven from the engine crank shaft (or any other suitable shaft connected thereto), while the other section carries the single crank for driving the rods which operate the several indicators. These two sections are connected to each other by a differential. By manipulating the bridge of this differential, the section carrying the indicator driving crank may be brought into the proper position for driving the particular indicator from which it is desired to obtain a diagram, this position having been first given a register mark upon the bridge of the differential to correspond with a register mark on the engine frame.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

In the drawings:—

Figure 1:
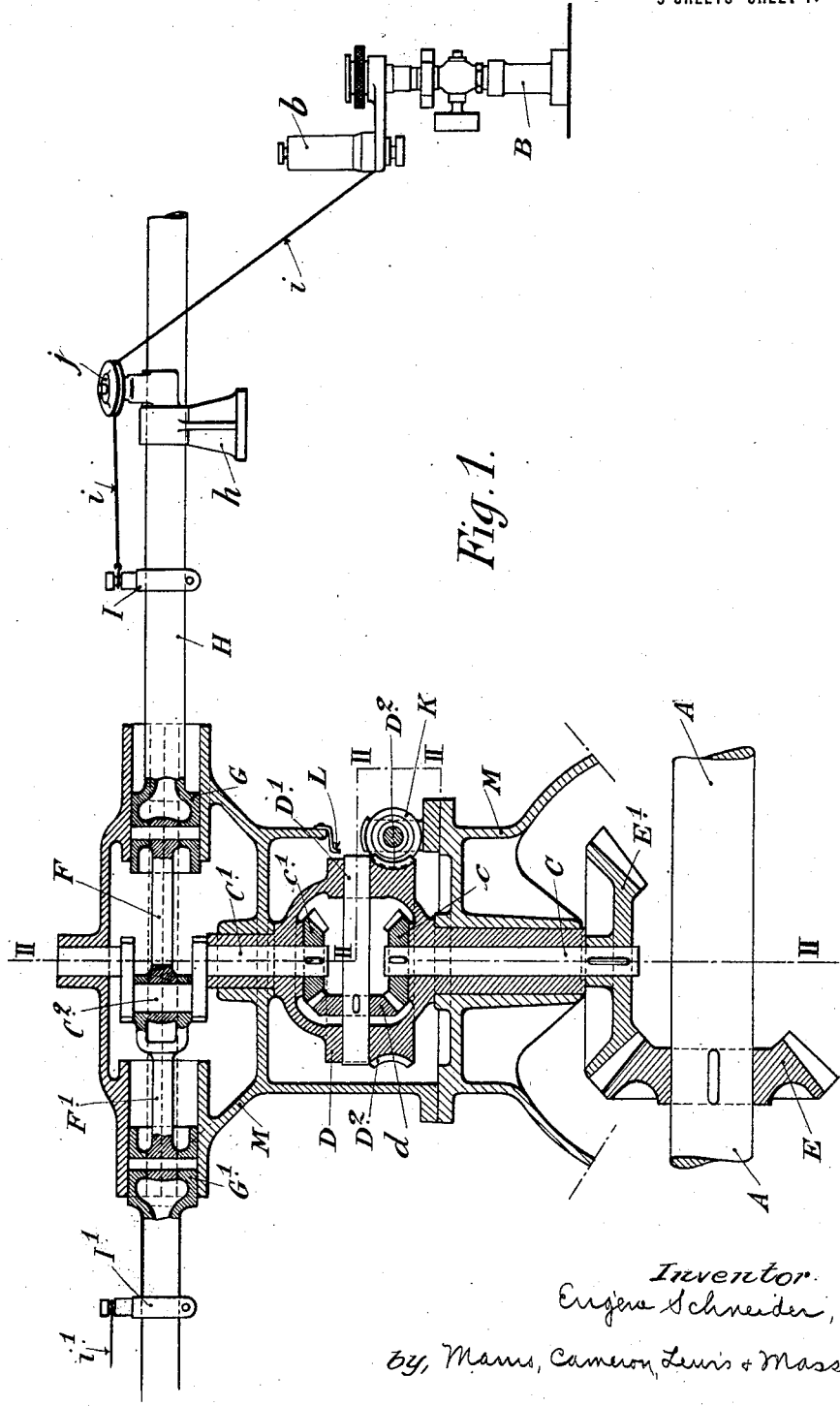
Figure 1 is a vertical central section of the improved mechanism.
Figure 2:
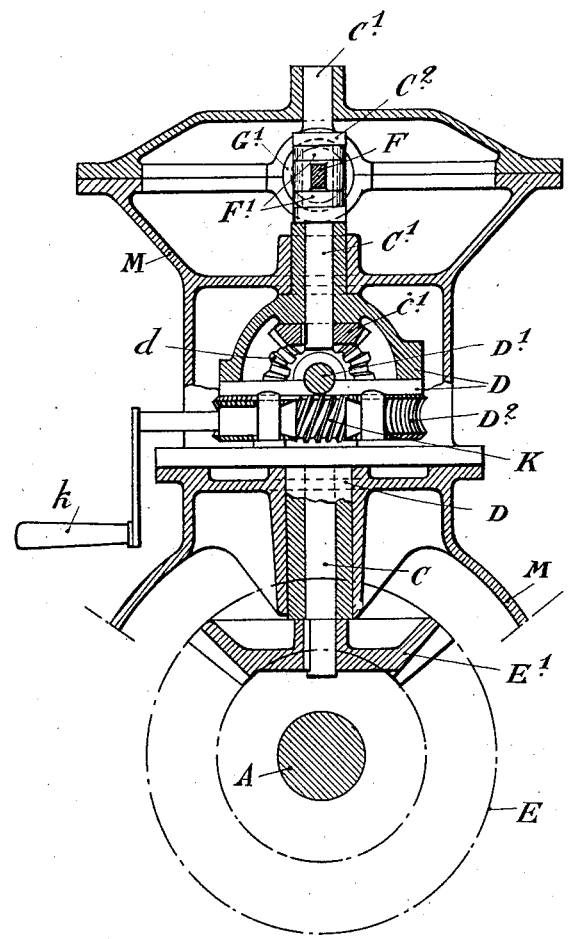
Fig. 2 is a vertical section on the line II—II of Fig. 1.
Figure 3:
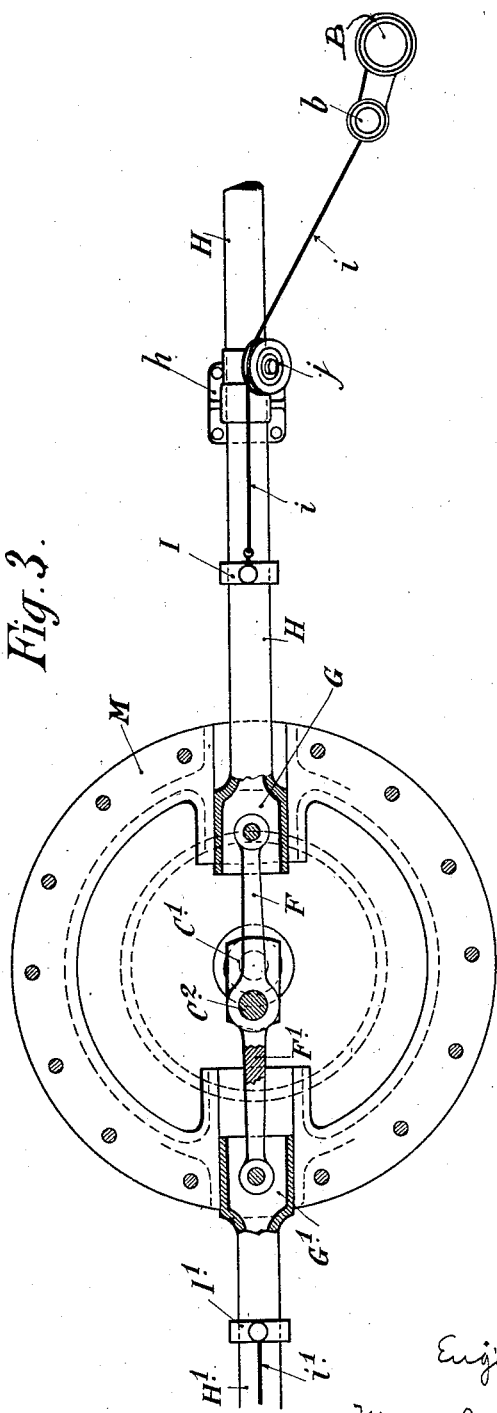
Fig. 3 is a plan thereof.

In these various figures, A is the crank shaft of a multiple-cylinder engine, or a distribution shaft of the latter, or any suitable intermediate shaft from which power may be taken for driving the several indicators; said indicators may be of any suitable type one only being represented at B.

According to this invention, the single drive of the indicator drums comprises a shaft composed of two sections C and $C^1$ connected to each other by a differential. D is the box of this differential in which the two shaft sections C, $C^1$, are journaled. The box in its turn is journaled in a frame M and carries on a shaft $D^1$ a pinion $d$ which is fixed on the latter and engages with the pinions $c$, $c^1$, fixed on the shaft sections C and $C^1$ respectively. The shaft section C receives its motion from the shaft A through any suitable transmission shown as comprising two bevel pinions E, $E^1$.

The alternating motion for actuating the paper drums of all the indicators is obtained by a crank $C^2$ on the shaft section $C^1$. In the example shown, it is assumed that this single drive is located in the middle of the group of engine cylinders, so that the indicators B to be driven are located equally on either side of the mechanism. The actuation of the two groups of indicators by the single crank $C^2$ is, in this example, effected by means of two small connecting rods F, $F^1$, the heads of which are jointed to the crank $C^2$ of the counter-shaft C, $C^1$, the foot of the corresponding connecting rods being jointed to slide blocks G, G¹ guided in the frame M and forming the ends of rod H, H¹.

The rods H, H¹, which may be further guided by any suitable number of guide brackets $h$, carry a number (corresponding to the number of cylinders and indicators B) of jockeys I, I¹, to which are attached the strings $i$, $i^1$, for actuating the paper drums $b$ of the corresponding indicators B. The strings $i$ are guided in the usual manner over grooved pulleys $j$ that may be carried by the brackets $h$.

The rotary movement of the box D of the differential, to secure a suitable variation of the angle of the crank C² for the purpose of actuating any one of the paper drums $b$, may be produced by means of a worm K journaled in the frame M, provided with an operating hand-wheel $k$ and meshing with a helical gear D² formed on the said box D.

It is to be understood that the proportion of the length of the connecting rods F, F¹ to the length of the crank C² is the same as that of the driving connecting rods of the engine to the cranks of the latter.

For adjusting the mechanism in assembling the same, the driving crank of each cylinder of the engine is brought in succession to one of its dead points (top or bottom), and then, by rotating the worm K, the crank C² is driven through the box D and the pinions $d$, $c^1$ of the differential, so that the said crank C² is brought to the same dead point, and consequently to the required position for properly driving the respective indicator of the selected cylinder. It is then merely necessary to place on the box D, opposite a pointer L carried by the frame M, a register mark corresponding to the said cylinder.

If, during the operation of the engine, it is desired to obtain a diagram from any one of the cylinders, it is merely necessary, by means of the worm K, to bring the box D into the position in which the register mark of the said cylinder is opposite the index L.

Instead of locating the hereinbefore described mechanism in the middle of the group of engine cylinders, it may be located at the end of the group, as, for example, in the case of cylinders the axes of which are all located in one and the same plane. In such a case, a single small connecting rod will be sufficient for driving a single rod to which all the strings for actuating the indicators are attached.

The number of the actuating connecting rods F, F¹, as well as their location on the single counter-shaft C, C¹, may vary according to the manner of grouping of the cylinders and the number of these cylinders.

While the embodiment illustrated on the drawing has been described with considerable particularity, it is to be understood that the invention is not to be restricted thereto as the same is capable of receiving a variety of mechanical expressions. Reference is to be had to the appended claims for a definition of the limits of the invention.

What is claimed is:—

1. In indicator-actuating mechanism, for a multiple-cylinder engine, in combination with a driving shaft driven by the engine, a counter-shaft driven from said driving shaft and provided with a single crank and a differential between said crank and the driving shaft, operative connections between said crank and the engine indicators, and means for rotating said differential to position said crank in correspondence with the cranks of the several cylinders.

2. In indicator-actuating mechanism for a multiple-cylinder engine, in combination with a driving shaft driven by the engine, a counter-shaft comprising two sections one of which is connected to said driving shaft, a single crank connected to the other of said sections, a differential intermediate said sections, operative connections between said crank and the engine indicators, and means for rotating said differential to position said crank in correspondence with the cranks of the several cylinders.

3. In indicator-actuating mechanism for a multiple-cylinder engine, in combination with a driving shaft driven by the engine, a counter-shaft driven from said driving shaft and provided with a single crank and a differential between said crank and the driving shaft, operative connections between said crank and the engine indicators, a box in which said differential is journaled, and means for rotating said box to position said crank in correspondence with the cranks of the several cylinders.

4. In indicator-actuating mechanism for a multiple-cylinder engine, in combination with a driving shaft driven by the engine, a counter-shaft driven from said driving shaft and provided with a single crank and a differential between said crank and the driving shaft, operative connections between said crank and the engine indicators, a box in which said differential is journaled, and a worm and worm-wheel for rotating said box to position said crank in correspondence with the cranks of the several cylinders.

5. In indicator-actuating mechanism for a multiple-cylinder engine, in combination with a driving shaft driven by the engine, a counter-shaft driven from said driving shaft and provided with a single crank and a differential between said crank and the driving shaft, operative connections between said crank and the engine indicators, a box in which said differential is journaled, means for rotating said box to position said crank in correspondence with the cranks of the several cylinders, and means for indicating the position of said crank when in correspondence with each of the cranks of said cylinders.

6. In indicator-actuating mechanism for a multiple-cylinder engine, in combination with a driving shaft driven by the engine, a counter-shaft driven from said driving shaft and comprising a single crank and a differential between said crank and the driving shaft, operative connections between said crank and all of the engine indicators, and means to adjust said differential to position said crank in correspondence with the cranks of the several cylinders.

7. In indicator-actuating mechanism for a multiple-cylinder engine, in combination with a driving shaft driven by the engine, a counter-shaft driven from the driving shaft and provided with a single crank, operative connections between said crank and all of the engine indicators, and means to adjust said crank with respect to its driving connections to position said crank in correspondence with the cranks of the several cylinders.

8. In indicator-actuating mechanism for a multiple-cylinder engine, in combination with a driving shaft driven by the engine, a counter-shaft driven from the driving shaft and provided with a single crank, operative connections between said crank and all of the engine indicators, means to adjust said crank with respect to its driving connections to position said crank in correspondence with the cranks of the several cylinders, and means for indicating the position of said crank when in correspondence with each of the cranks of said cylinders.

In testimony whereof I have signed this specification.

EUGÈNE SCHNEIDER.

Witnesses:
 ANDRE MOSTICKER,
 JOHN F. SIMONS.

Copies of this patent may be obtained for five cents each, by addressing the "Commissioner of Patents, Washington, D. C."